US010812281B2

(12) United States Patent
Lewis et al.

(10) Patent No.: US 10,812,281 B2
(45) Date of Patent: Oct. 20, 2020

(54) METHODS, SYSTEMS, AND MEDIA FOR SENDING A MESSAGE ABOUT A NEW VIDEO TO A GROUP OF RELATED USERS

(71) Applicant: Google LLC, Mountain View, CA (US)

(72) Inventors: Justin Lewis, South San Francisco, CA (US); Ruxandra Georgiana Davies, Santa Monica, CA (US)

(73) Assignee: Google LLC, Mountain View, CA (US)

(*) Notice: Subject to any disclaimer, the term of this patent is extended or adjusted under 35 U.S.C. 154(b) by 64 days.

(21) Appl. No.: 16/176,569

(22) Filed: Oct. 31, 2018

(65) Prior Publication Data

US 2019/0068392 A1    Feb. 28, 2019

Related U.S. Application Data

(63) Continuation of application No. 15/706,887, filed on Sep. 18, 2017, now Pat. No. 10,122,541, which is a
(Continued)

(51) Int. Cl.
*H04L 12/18* (2006.01)
*H04L 29/08* (2006.01)
*H04L 12/58* (2006.01)

(52) U.S. Cl.
CPC ........ *H04L 12/1895* (2013.01); *H04L 12/185* (2013.01); *H04L 51/04* (2013.01); *H04L 51/10* (2013.01); *H04L 51/24* (2013.01); *H04L 51/32* (2013.01); *H04L 67/20* (2013.01); *H04L 67/26* (2013.01); *H04L 67/306* (2013.01); *H04L 67/325* (2013.01)

(58) Field of Classification Search
None
See application file for complete search history.

(56) References Cited

U.S. PATENT DOCUMENTS 7,669,177 B2    2/2010  Gerber et al.
7,698,276 B2 *  4/2010  Seshadri ............. G06F 16/9535
                                                   719/318
(Continued)

OTHER PUBLICATIONS

Notice of Allowance dated May 22, 2017 in U.S. Appl. No. 14/715,302.
(Continued)

*Primary Examiner* — Michael J Moore, Jr.
(74) *Attorney, Agent, or Firm* — Byrne Poh LLP

(57) ABSTRACT

Methods, systems, and media for sending a message about a new video to a group of related users are provided. In accordance with some embodiments, the method comprises: determining that a new video associated with a content creator has been uploaded to a video sharing service; identifying a group of candidate users to receive a message indicating that the new video is available; identifying a sub-group of users within the group of candidate users based on relationships of users within the group to each other; determining a time to send the message; transmitting the message to the sub-group of users at the determined time; determining that the message has been selected by a user device associated with a user of the sub-group of users; and causing the new video to be presented in a user interface including a communication interface associated with the sub-group of users on the user device.

21 Claims, 5 Drawing Sheets

Related U.S. Application Data continuation of application No. 14/715,302, filed on May 18, 2015, now Pat. No. 9,768,974.

(56) References Cited

U.S. PATENT DOCUMENTS

| | | | |
|---|---|---|---|
| 8,169,916 B1 | 5/2012 | Pai et al. | |
| 8,793,806 B1 | 7/2014 | Truong et al. | |
| 8,869,207 B1 | 10/2014 | Earle | |
| 9,019,077 B2 * | 4/2015 | Hazzani | H04W 4/029 |
| | | | 340/8.1 |
| 9,177,072 B2 * | 11/2015 | Krishnamurthy | G06F 12/126 |
| 9,405,804 B1 | 8/2016 | DiDomenico et al. | |
| 9,609,380 B2 | 3/2017 | Laska et al. | |
| 2005/0160458 A1 | 7/2005 | Baumgartner | |
| 2007/0071209 A1 | 3/2007 | Horvitz et al. | |
| 2007/0156656 A1 * | 7/2007 | Pather | G06F 9/542 |
| 2009/0112998 A1 | 4/2009 | Oprescu-Surcobe | |
| 2009/0119737 A1 | 5/2009 | Perlman et al. | |
| 2009/0199230 A1 | 8/2009 | Kumar et al. | |
| 2011/0069643 A1 | 3/2011 | Yoakum et al. | |
| 2011/0131496 A1 | 6/2011 | Abram et al. | |
| 2014/0065591 A1 * | 3/2014 | Tulgan | G09B 5/08 |
| | | | 434/350 |
| 2014/0068468 A1 | 3/2014 | Yoon | |
| 2014/0130073 A1 | 5/2014 | Yu et al. | |
| 2015/0113554 A1 * | 4/2015 | Stern | H04N 21/252 |
| | | | 725/32 |
| 2016/0217377 A1 * | 7/2016 | Senarath | H04L 67/2847 |
| 2016/0314355 A1 | 10/2016 | Laska et al. | |

OTHER PUBLICATIONS

Notice of Allowance dated Jun. 22, 2018 in U.S. Appl. No. 15/706,887.

Office Action dated Feb. 7, 2018 in U.S. Appl. No. 15/706,887.

Office Action dated Mar. 1, 2017 in U.S. Appl. No. 14/715,302.

Office Action dated Nov. 28, 2016 in U.S. Appl. No. 14/715,302.

* cited by examiner

METHODS, SYSTEMS, AND MEDIA FOR SENDING A MESSAGE ABOUT A NEW VIDEO TO A GROUP OF RELATED USERS

CROSS-REFERENCE TO RELATED APPLICATIONS

This application is a continuation of U.S. patent application Ser. No. 15/706,887, filed Sep. 18, 2017, which is a continuation of U.S. patent application Ser. No. 14/715,302, filed May 18, 2015, each of which is hereby incorporated by reference herein in its entirety.

TECHNICAL FIELD

The disclosed subject matter relates to methods, systems, and media for sending a message about a new video to a group of related users.

BACKGROUND

People often watch videos uploaded and stored on video sharing services. Often, groups of people, such as people who are friends with each other, are interested in similar videos. For example, a group of people might all be interested in a video created by the same person or related to the same topic. Additionally, the group of people may want to discuss the video with each other after watching it. However, it can be difficult for the group to know about the availability of a new video that they are all interested in.

Accordingly, it is desirable to provide methods, systems, and media for sending a message about a new video to a group of related users.

SUMMARY

Methods, systems, and media for sending a message about a new video to a group of related users are provided.

In accordance with some embodiments of the disclosed subject matter, a method for sending a message about a new video to a group of related users is provided, the method comprising: determining that a new video associated with a content creator has been uploaded to a video sharing service; identifying a group of candidate users to receive a message indicating that the new video is available; identifying a sub-group of users within the group of candidate users based on relationships of users within the group to each other; determining a time to send the message to the sub-group of users; transmitting the message to the sub-group of users at the determined time; determining that the message has been selected by a user device associated with a user of the sub-group of users; and causing the new video to be presented in a user interface including a communication interface associated with the sub-group of users on the user device.

In accordance with some embodiments of the disclosed subject matter, a system for sending a message about a new video to a group of related users is provided, the system comprising: a hardware processor that is programmed to: determine that a new video associated with a content creator has been uploaded to a video sharing service; identify a group of candidate users to receive a message indicating that the new video is available; identify a sub-group of users within the group of candidate users based on relationships of users within the group to each other; determine a time to send the message to the sub-group of users; transmit the message to the sub-group of users at the determined time; determine that the message has been selected by a user device associated with a user of the sub-group of users; and cause the new video to be presented in a user interface including a communication interface associated with the sub-group of users on the user device.

In accordance with some embodiments of the disclosed subject matter, a non-transitory computer-readable medium containing computer executable instructions that, when executed by the processor, cause the processor to perform a method for sending a message about a new video to a group of related users is provided. The method comprises: determining that a new video associated with a content creator has been uploaded to a video sharing service; identifying a group of candidate users to receive a message indicating that the new video is available; identifying a sub-group of users within the group of candidate users based on relationships of users within the group to each other; determining a time to send the message to the sub-group of users; transmitting the message to the sub-group of users at the determined time; determining that the message has been selected by a user device associated with a user of the sub-group of users; and causing the new video to be presented in a user interface including a communication interface associated with the sub-group of users on the user device.

In accordance with some embodiments of the disclosed subject matter, a system for sending a message about a new video to a group of related users is provided, the system comprising: means for determining that a new video associated with a content creator has been uploaded to a video sharing service; means for identifying a group of candidate users to receive a message indicating that the new video is available; means for identifying a sub-group of users within the group of candidate users based on relationships of users within the group to each other; means for determining a time to send the message to the sub-group of users; means for transmitting the message to the sub-group of users at the determined time; means for determining that the message has been selected by a user device associated with a user of the sub-group of users; and means for causing the new video to be presented in a user interface including a communication interface associated with the sub-group of users on the user device.

In some embodiments, the system further comprises: means for identifying one or more users within the sub-group of users who are unlikely to participate in a conversation about the new video; and means for removing the identified one or more users from the sub-group of users.

In some embodiments, the one or more users are identified based at least in part on whether the one or more users are participating in a second conversation.

In some embodiments, means for identifying the group of candidate users further comprises means for determining that a likelihood that each user in the group of candidate users will engage with the new video is greater than a predetermined threshold.

In some embodiments, means for transmitting the message to the sub-group of users further comprises: means for transmitting the message to a second user device associated with a second user of the sub-group of users; means for determining that the message has been selected on the second user device; and means for transmitting the message to the remaining sub-group of users in response to determining that the message has been selected on the second user device.

In some embodiments, the second user of the sub-group of users is identified based on a likelihood that the second user will engage with the new video.

In some embodiments, the user interface is associated with a conversation identifier.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1A:
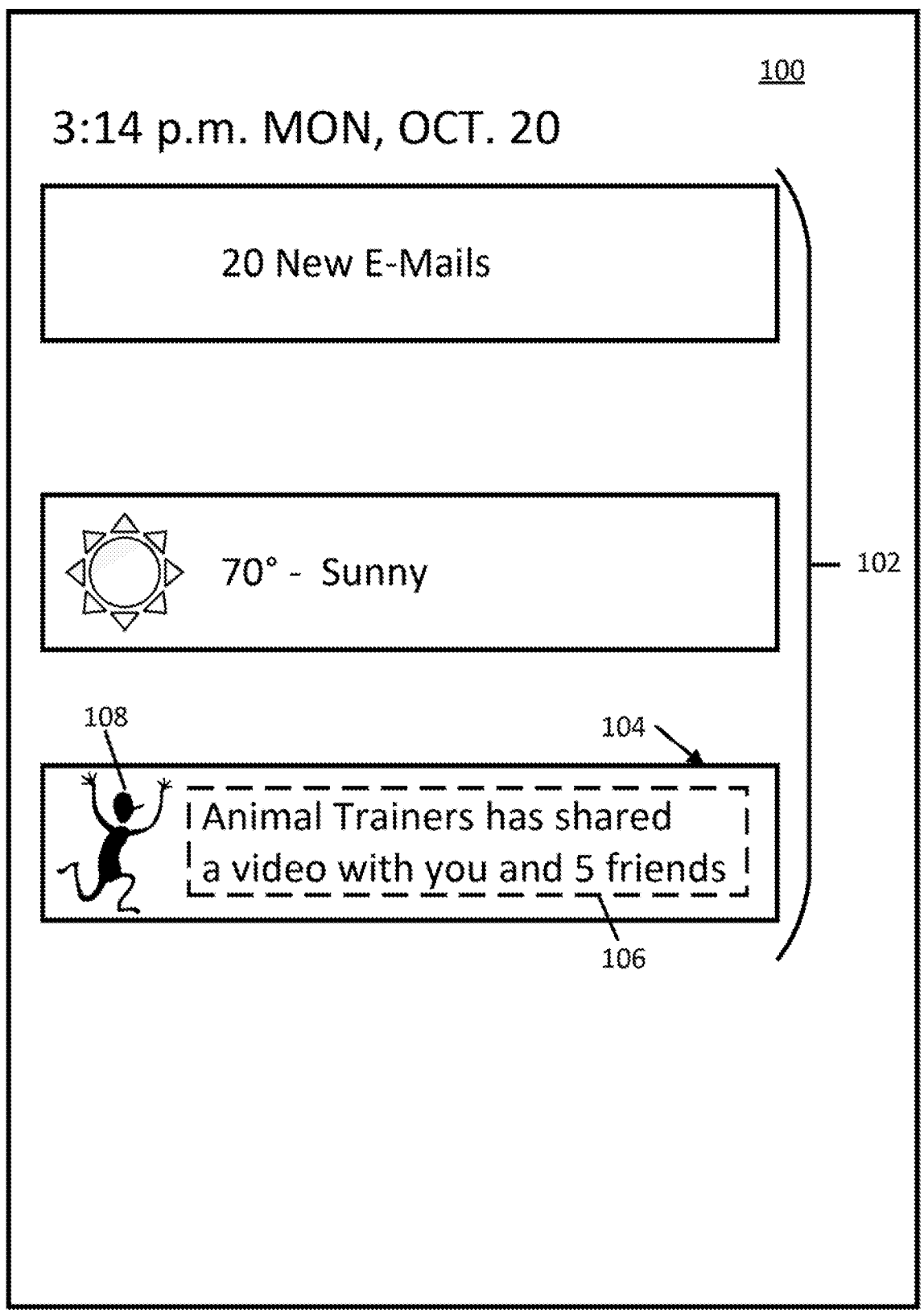
FIG. 1A shows an example of a user interface for presenting a message indicating that a new video is available in accordance with some embodiments of the disclosed subject matter.

In accordance with various embodiments, mechanisms (which can include methods, systems, and media) for sending a message about a new video to a group of related users are provided.

In some embodiments, the mechanisms described herein can determine that a content creator has uploaded a new video to a video sharing service. The mechanisms can then identify a group of users likely to be interested in viewing and/or discussing the new video, and can send a message (e.g., a push notification, a text message, an email, and/or any other suitable type of message) to the group of users indicating the availability of the new video. In some embodiments, in response to determining that the message has been selected, the mechanisms can cause the new video to be presented in a user interface that includes a communication interface for presenting a live conversation and/or chat among members of the group of users.

In some embodiments, the mechanisms can identify the group of users based on any suitable information. For example, in some embodiments, the group of users can include users that are connected to the content creator on a social networking site. As a more particular example, the group of users can include users that have subscribed to content made available by the content creator, users that have previously shared content made available by the content creator, and/or any other suitable type of connection. As another example, in some embodiments, the group of users can include users that are both connected to the content creator and who are connected to each other (e.g., on a social networking site). As a more particular example, in some embodiments, the group of users can include users that are directly connected (e.g., a first-degree relationship) to each other. As another more particular example, in some embodiments, the group of users can include users who all have at least an indirect connection (e.g., a mutual connection, and/or any other suitable indirect connection) with each other.

In some embodiments, the mechanisms can additionally determine a time at which the message is to be sent to the group of users. For example, in some embodiments, the mechanisms can determine that the message is to be sent immediately. As another example, in some embodiments, the mechanisms can determine that transmission of the message is to be delayed (e.g., by an hour, by a day, by a week, and/or any other suitable time period). As a more particular example, in some embodiments, the mechanisms can determine a time the message is to be sent based on how recently other messages have been sent to the group of users, how recently the group of users has participated in a conversation about a different video, and/or any other suitable information.

Note that, although the embodiments described herein generally relate to video content, in some embodiments, the mechanisms described can be used with any suitable type(s) of content. For example, in some embodiments, the content can include audio content (e.g., music, radio programs, audiobooks, and/or any other suitable content), games, electronic documents (e.g., emails, e-books, and/or any other suitable electronic documents), and/or any other suitable type(s) of content.

Turning to FIG. 1A, an example 100 of a user interface for presenting a message indicating that a new video is available for viewing is shown in accordance with some embodiments of the disclosed subject matter. As illustrated, in some embodiments, user interface 100 can include a group of messages 102.

Group of messages 102 can include any suitable number (e.g., zero, one, two, five, and/or any other suitable number) of individual messages, such as message 104. In some embodiments, messages in group of messages 102 can relate to any suitable topic, such as an indication of a current weather condition, an indication of content that has been recently downloaded, an indication that new communication (e.g., an email, a voice mail, a text message, a chat message, and/or any other suitable type of communication) has been received, and/or any other suitable topic. In some embodiments, a message in group of messages 102 can include an indication that a new video has been uploaded to a video sharing service and/or shared with a user of a user device presenting user interface 100, such as message 104 in FIG. 1A.

An individual message (such as message 104) can include any suitable content. For example, as shown in FIG. 1A, in some embodiments, message 104 can include text 106 and image 108. Text 106 can be any suitable text corresponding to the content of message 104. In some embodiments, image 108 can be any suitable image associated with the content of message 104. For example, in instances where message 104 indicates that a video has been shared with a user of the user device on which user interface 100 is presented, image 108 can be an image representing the person who shared the video (e.g., an image uploaded by the person, an image associated with a user account used to share the video, and/or any other suitable image). In some embodiments, message 104 can include any other suitable content, such as links, graphics, animations, icons, videos, and/or any other suitable content.

Figure 1B:
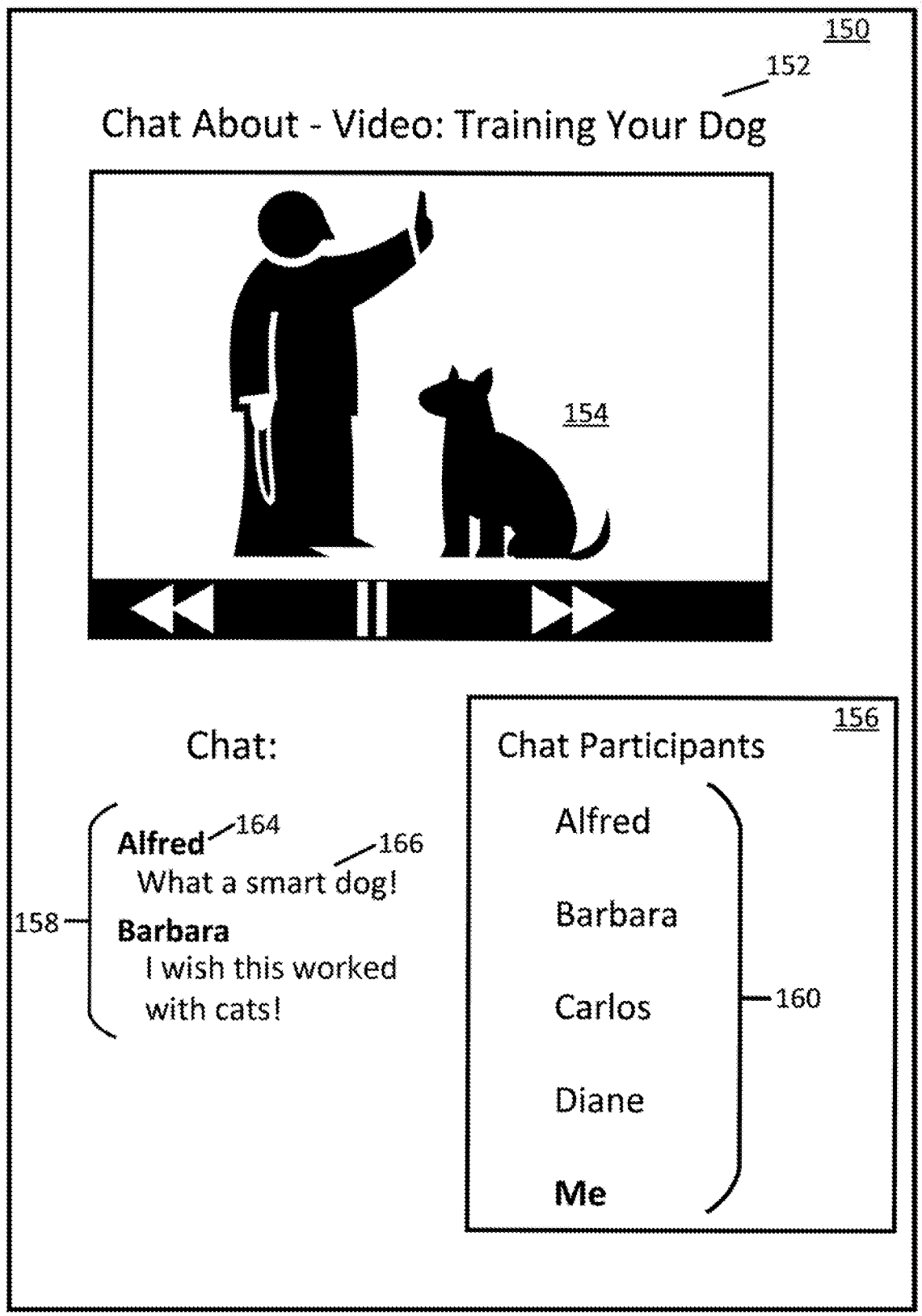
FIG. 1B shows an example of a user interface for presenting a new video in a user interface that includes a group conversation in accordance with some embodiments of the disclosed subject matter.

In some embodiments, message 104 can be selectable, and selection (e.g., touching, clicking, etc.) of message 104 can cause a second user interface to be presented. In instances where message 104 includes an indication that a new video is available for viewing and/or has been shared, the second user interface can include a video player window for presenting the new video, and/or a communication interface for a group conversation and/or chat with one or more other users who have also received message 104. FIG. 1B shows an example 150 of a user interface for presenting the new video in connection with a group conversation in accordance with some embodiments of the disclosed subject matter.

As illustrated, user interface 150 can include a title 152, a video 154, an indicator of conversation participants 156, and a group conversation 158.

Title 152 can be any suitable title indicating content of user interface 150. In some embodiments, title 152 can include any suitable text, images, icons, graphics, animations, videos, hyperlinks, and/or any other suitable content. Note that the position of title 152 in user interface 150 is shown as an example, and title 152 can be located at any suitable position. In some embodiments, title 152 can be omitted.

Video 154 can be a presentation of the new video indicated in message 104 of FIG. 1A (described above). In some embodiments, video 154 can be presented within a video player window, which can include any suitable controls, such as a pause control, fast-forward and/or rewind controls, a volume adjustment control, and/or any other suitable controls.

Indicator of conversation participants 156 can be any suitable interface for indicating identities of users currently participating in a group conversation, logged in to a group conversation, and/or invited to a group conversation. For example, in some embodiments, indicator of conversation participants 156 can include a list of users 160 who selected message 104 (as shown in and described above in connection with FIG. 1A) indicating that a new video was available for viewing. In some embodiments, each user in list of users 160 can be associated with any suitable additional information, such as whether the user has already watched the video (e.g., video 154), whether the user has commented on and/or shared the video, whether a user device on which a different instance of user interface 150 is being presented is currently in an active state (e.g., indicating whether other participants in the group conversation are currently and/or have recently used their user device), and/or any other suitable information. In some embodiments, the additional information can be presented using any suitable text, icons, graphics, animations, videos, and/or any other suitable content.

Group conversation 158 can be any suitable conversation and/or live chat among multiple users (e.g., those in list of users 160). In some embodiments, group conversation 158 can include any suitable number of comments, such as comment 166. In some embodiments, comment 166 can include any suitable content, such as text, images, icons, graphics, animations, videos, hyperlinks, and/or any other suitable content. In some embodiments, comment 166 can be associated with a username 164, which can indicate a user who entered comment 166. In some embodiments, comment 166 can be associated with any other suitable information, such as a timestamp indicating a time when comment 166 was entered, and/or any other suitable information.

In some embodiments, group conversation 158 can be updated in any suitable manner. For example, in some embodiments, the most recent N (e.g., two, five, ten, and/or any other suitable number) comments can be shown in user interface 150. As another example, in some embodiments, group conversation 158 can include an input to control which portion of group conversation 158 is presented in user interface 150. As a more particular example, in some embodiments, the input can include a slider, and movement of the slider can cause a different portion of group conversation 158 to be presented.

Figure 2:
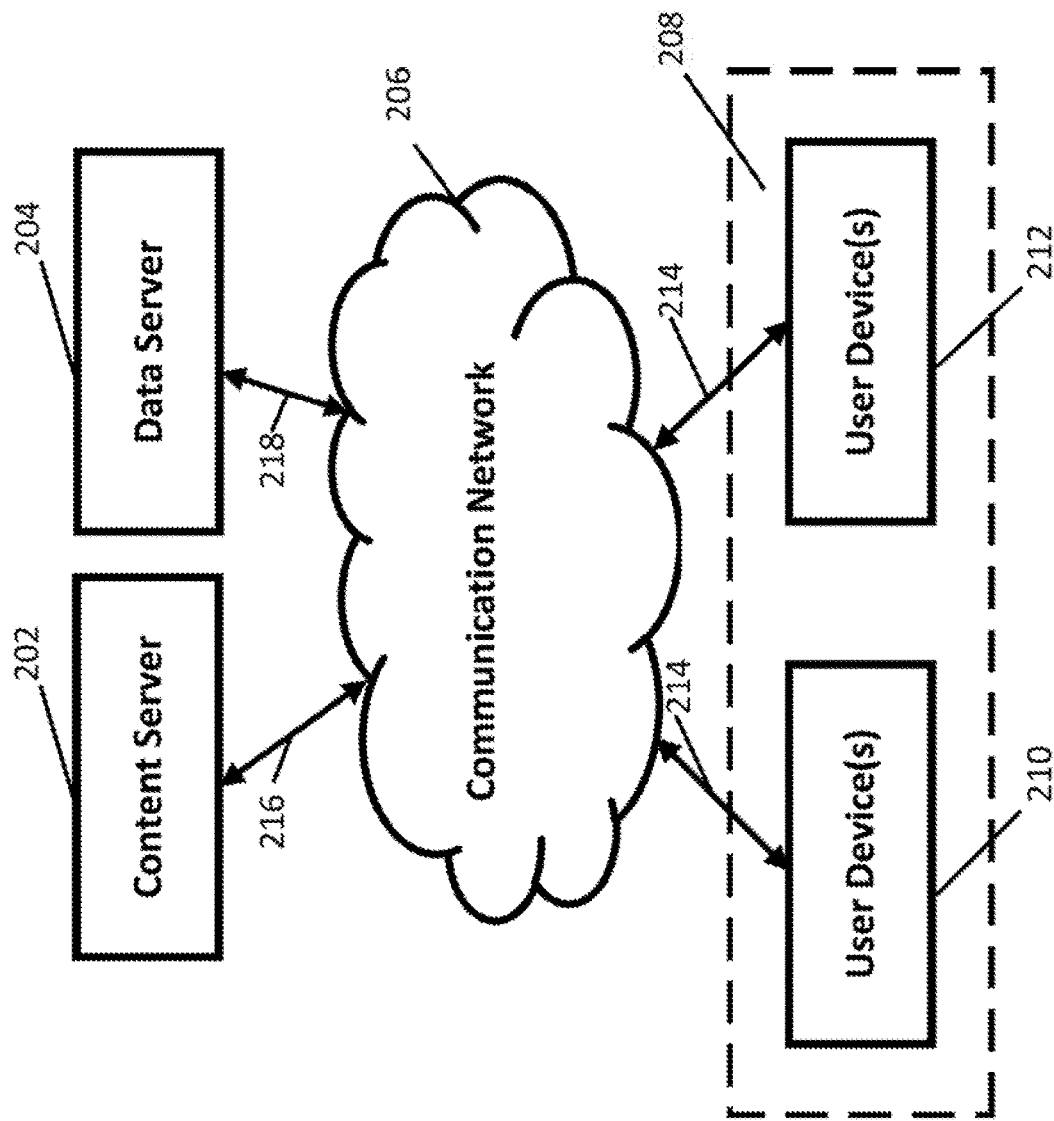
FIG. 2 shows a schematic diagram of an illustrative system suitable for implementation of mechanisms described herein for sending a message about a new video to a group of related users in accordance with some embodiments of the disclosed subject matter.

Turning to FIG. 2, an example 200 of hardware for sending a message that can be used in accordance with some embodiments of the disclosed subject matter is shown. As illustrated, hardware 200 can include one or more servers such as a content server 202 and a data server 204, as well as a communication network 206, and/or one or more user devices 208, such as user devices 210 and 212.

In some embodiments, content server 202 can be any suitable server for storing media content and/or delivering such media content to user device 208. For example, content server 202 can be a server that streams and/or otherwise transmits media content to user device 208 via communication network 206. Media content provided by content server 202 can be any suitable content, such as video content, audio content, electronic books, documents, images, and/or any other suitable type of media content. As a more particular example, media content can include television programs, movies, cartoons, sound effects, live-streamed content (e.g., a streaming radio show, a live concert, and/or any other suitable type of streaming live content), and/or any other suitable type of media content. Media content can be created and/or uploaded to content server 202 by any suitable entity. For example, in some embodiments the media content can include user-generated content. As another example, in some embodiments, the media content can include content created and/or uploaded by a particular group and/or channel. In some embodiments, media content stored on content server 202 can be stored in association with an indicator of a creator and/or uploader of the media content. In some embodiments, content server 202 can be omitted.

In some embodiments, data server 204 can be any suitable server for identifying a group of users to send a message indicating that a new video is available to view and sending the message to the group of users. For example, in some embodiments, data server 204 can identify a group of candidate users based on an estimated likelihood that each user will view and/or interact with the new video if sent a message about the new video, whether each user is connected to a creator of the new video (e.g., has viewed videos created by the content creator in the past, has subscribed to videos associated with the content creator, has subscribed to social networking posts and/or a group associated with the content creator on a social networking site, and/or any other suitable criteria) as shown in and described below in connection with FIG. 4. As another example, in some embodiments, data server 204 can identify a sub-group of a group of candidate users who are to receive the message as shown in and described below in connection with FIG. 4. As a more particular example, in some embodiments, data server 204 can identify the sub-group of users as those in the larger group of candidate users who are connected to each other on, for example, a social networking service (e.g., have a first-degree connection, have a mutual connection, and/or any other suitable relationship). As yet another example, in some embodiments, data server 204 can transmit a message to user devices associated with each user in an identified group of users, as described below in connection with FIG. 4. As still another example, in some embodiments, data server 204 can cause a user interface that includes a communication interface for participating in a group conversation to be presented on one or more user devices. In some embodiments, data server 204 can be omitted.

Communication network 206 can be any suitable combination of one or more wired and/or wireless networks in some embodiments. For example, communication network 206 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 208 can be connected by one or more communications links 214 to communication network 206 that can be linked via one or more communications links (e.g., communications links 216 and/or 218) to content server 202 and data server 204. Communications links 214, 216, and/or 218 can be any communications links suitable for communicating data among user devices 208 and servers 202 and/or 204 such as network links, dial-up links, wireless links, hard-wired links, any other suitable communications links, or any suitable combination of such links.

In some embodiments, user devices 208 can include one or more computing devices suitable for receiving a message indicating availability of a new video, presenting the new video in a user interface that includes a communication interface for a group conversation, and/or any other suitable functions. For example, in some embodiments, user devices 208 can be implemented as a mobile device, such as a smartphone, mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 208 can be implemented as a non-mobile device such as a desktop computer, a set-top box, a television, a streaming media player, a game console, and/or any other suitable non-mobile device.

Although content server 202 and data server 204 are illustrated as separate devices, the functions performed by content server 202 and data server 204 can be performed using any suitable number of devices in some embodiments. For example, in some embodiments, the functions performed by either of content server 202 and data server 204 can be performed on a single server. As another example, in some embodiments, multiple devices can be used to implement the functions performed by content server 202 and/or data server 204.

Although two user devices 210 and 212 are shown in FIG. 2, any suitable number of user devices, and/or any suitable types of user devices, can be used in some embodiments.

Figure 3:
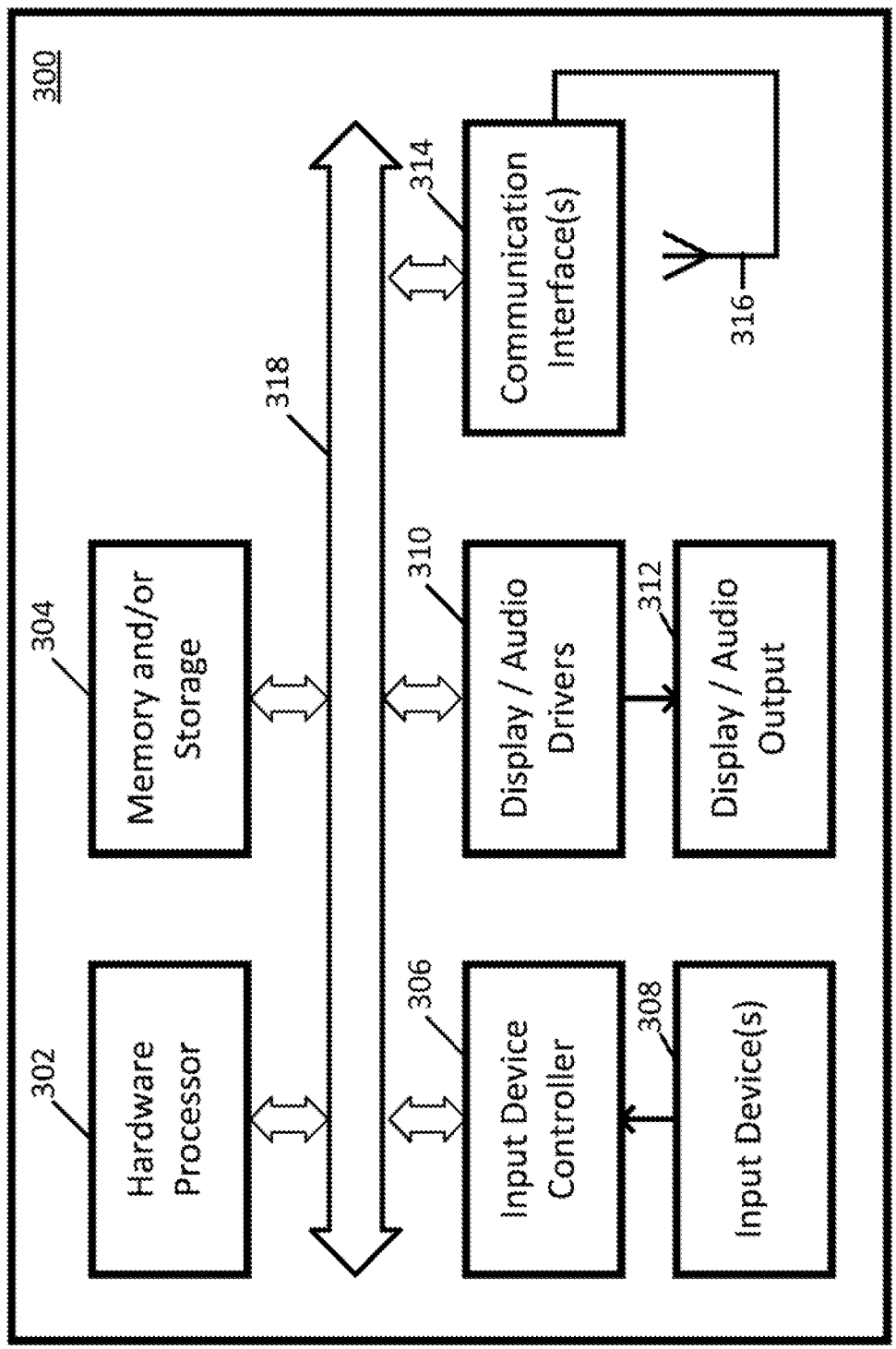
FIG. 3 shows a detailed example of hardware that can be used in a server and/or a user device of FIG. 2 in accordance with some embodiments of the disclosed subject matter.

Content server 202, data server 204, and user devices 208 can be implemented using any suitable hardware in some embodiments. For example, in some embodiments, devices 202, 204, and 208 can be implemented using any suitable general purpose computer or special purpose computer. For example, a server may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage 304 of a server (e.g., such as one of servers 202 and 204). For example, the server program can cause hardware processor 302 to determine a likelihood that a user associated with a particular user device will view and/or interact with a video if sent a message about the video, identify a group and/or a sub-group of users to be presented with a message indicating that a new video is available to view, and/or perform any other suitable actions. In some embodiments, hardware processor 302 can be controlled by a computer program stored in memory and/or storage 304 of user device 208. For example, the computer program can cause hardware processor 302 to present a user interface containing a group conversation in which a video is presented, and/or perform any other suitable actions.

Memory and/or storage 304 can be any suitable memory and/or storage for storing programs, data, media content, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 206 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 206) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

Figure 4:
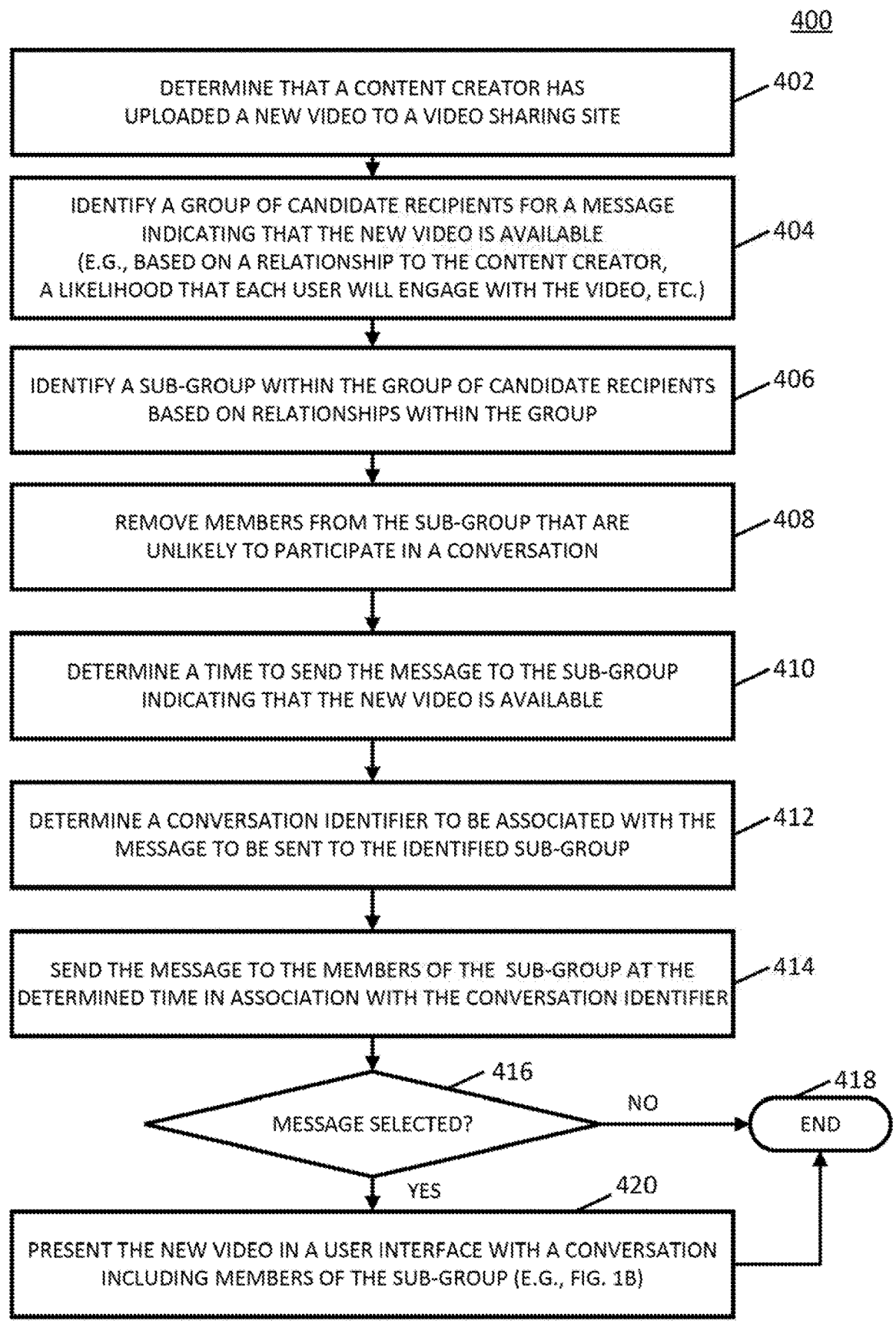
FIG. 4 shows an example of a process for sending a message to a group of users in accordance with some embodiments of the disclosed subject matter.

Turning to FIG. 4, an example 400 of a process for identifying a group of users to present a message and sending the message to the group of users is shown in accordance with some embodiments of the disclosed subject matter.

Process 400 can begin by determining that a content creator has uploaded and/or made available a new video to a video sharing service at 402. In some embodiments, the video can be uploaded to content server 202. Process 400 can use any suitable information or technique(s) to determine that the content creator has uploaded the new video. For example, in some embodiments, content server 202 can transmit a notification to process 400 in response to receiving a video upload from the content creator. As another example, in some embodiments, process 400 can query content server 202 for a list of videos that have been uploaded within a predetermined time period (e.g., within the previous five minutes, within the previous hour, within the previous day, and/or any other suitable time range), and can identify the content creator and the new video based on the received information. Note that, in some embodiments, process 400 can identify a video that is not new, for example, a video that has recently become popular.

Process 400 can identify a group of candidate recipients for a message indicating that the new video is available at 404. The group of candidate recipients can include any suitable users. For example, in some embodiments, users in the group of candidate recipients can include users that have a user account on the video sharing service to which the new video has been uploaded. As another example, in some embodiments, process 400 can identify users that are likely to enjoy the new video and/or engage with (e.g., comment on, share, and/or otherwise interact with) the new video after watching. As a more particular example, in some embodiments, process 400 can identify users who are connected to the content creator (e.g., have watched other videos uploaded and/or posted by the content creator, have subscribed to a channel and/or a feed associated with the content creator, and/or any other suitable relationship). As another more particular example, in some embodiments, process 400 can identify users who have watched videos related to similar content (e.g., within a similar genre, related to a similar topic, and/or any other suitable similar content).

Note that, in some embodiments, process 400 can calculate a likelihood that a particular user will view and/or engage with (e.g., view, share, comment on, and/or any other suitable manner of interaction) a particular video if sent a message about the video, and can identify the group of candidate recipients based on the calculated likelihood. In some embodiments, the likelihood can be calculated using any suitable combination of information and any suitable technique(s). For example, in some embodiments, process 400 can calculate the likelihood by combining information related to a number of other videos created by the content creator that have been viewed by a particular user, a number of videos related to similar content that have been viewed by a particular user, a number of times a particular user has shared videos (e.g., in a post on a social networking site, e-mailed to another user, and/or any other suitable method of sharing videos) either uploaded by the content creator or uploaded by a different content creator, and/or any other suitable information. In some embodiments, each item of information can be combined using a weighted average and/or any other suitable metric to determine a likelihood that the user will interact with the particular video if sent a message about the video.

In some embodiments, videos related to similar content can be identified using any suitable information and/or technique(s). For example, in some embodiments, process 400 can determine that the new video is related to other videos the user has watched based on metadata (e.g., indicating a topic of a video, indicating a creator of a video, indicating a title of a video, and/or any other suitable metadata) associated with each of the videos. As another example, in some embodiments, process 400 can determine that the new video is related to other videos the user has watched based on a similarity of other users who have watched both videos.

Process 400 can identify a sub-group of users within the group of candidate recipients at 406. In some embodiments, the sub-group can be any suitable sub-group of the group of candidate recipients identified as described above in connection with block 404. For example, in some embodiments, process 400 can identify the sub-group of users based on users in the group of candidate recipients relationship's to each other. As a more particular example, in some embodiments, process 400 can identify a sub-group of users within the group of candidate recipients who are all directly connected (e.g., have a first-degree relationship in a social network) to one another. As another more particular example, in some embodiments, process 400 can identify a sub-group of users within the group of candidate recipients who have at least an n-degree (e.g., second-degree, third-degree, and/or any other suitable relationship) relationship in a social network with one another. As yet another more particular example, in some embodiments, process 400 can identify a sub-group of users within the group of candidate recipients where more than a predetermined number (e.g., more than five, more than ten, more than 50%, and/or any other suitable number and/or proportion) of the users have a first-degree relationship to one another, and the remaining members of the sub-group of users have an n-degree relationship to one another.

In some embodiments, process 400 can identify the sub-group of users using information indicating the likelihood that each user in the sub-group will view and/or interact with a video if presented with a message about the video. For example, in some embodiments, process 400 can identify a sub-group of users where each user in the sub-group of users has a likelihood of viewing and/or interacting with the video that is greater than a predetermined threshold (e.g., greater than 50%, greater than 70%, and/or any other suitable threshold). As another example, in some embodiments, process 400 can identify a sub-group of users where the average likelihood (e.g., averaged across all users in the sub-group of users) is greater than a predetermined threshold.

Process 400 can use any suitable technique or combination of techniques to identify the sub-group of users. For example, in some embodiments, process 400 can use any suitable graph theory techniques to identify the sub-group of users. Note that, in some embodiments, the sub-group of users can be pre-computed at any suitable time. For example, in some embodiments, a group of users forming a suitable sub-group (e.g., with each user in the sub-group directly connected to every other user, and/or any other suitable sub-group as described above) can be identified for a particular user. As a specific example, for a particular user, process 400 can identify multiple sub-groups that include the particular user in which every user is directly and/or indirectly connected to every other user. Process 400 can then store the identified sub-groups corresponding to the particular user for later use. For example, in some embodiments, after the new video is uploaded at block 402, process 400 can remove users in a stored sub-group who are not likely to enjoy and/or interact with the new video (e.g., have not watched other videos by the content creator and/or videos determined to be related to similar content as the new video) to identify one or more sub-groups to present with a message that the new video is available.

Process 400 can remove users from the sub-group of users who are unlikely to participate in a conversation related to the new video at 408. Process 400 can identify the users to be removed from the sub-group of users based on any suitable information. For example, in some embodiments, process 400 can identify the users to be removed based on whether a user is currently participating and/or has recently participated (e.g., within the last hour, within the last day, and/or any other suitable time period) in a conversation with a different sub-group of users. As another example, in some embodiments, process 400 can identify the users to be removed based on how recently a user has received another message relating to availability of a new video. As a more particular example, in some embodiments, process 400 can remove users who have received other messages relating to availability of new videos within a predetermined time range (e.g., within the last hour, within the last day, and/or any other suitable time period). As yet another example, in some embodiments, process 400 can remove users from the sub-group of users who have not selected received messages for more than a predetermined number (e.g., five, ten, and/or any other suitable number) and/or a predetermined proportion (e.g., 50%, 60%, and/or any other suitable proportion) of received messages.

Process 400 can determine a time to send the message to the sub-group of users indicating that the new video is available at 410. In some embodiments, the time can include any suitable combination of date and/or time. Process 400 can determine the time using any suitable information or technique(s). For example, in some embodiments, process 400 can determine the time based on whether the sub-group is currently participating and/or has recently participated in a conversation related to a different video. As a more particular example, in some embodiments, process 400 can determine that if the sub-group is currently participating and/or has participated in a conversation within a predetermined time period (e.g., within the last hour, within the last day, and/or any other suitable time range), the message should be delayed by a predetermined amount of time (e.g., to a time when at least a day has passed since the last conversation, and/or any other suitable delay). As another more particular example, in some embodiments, if process 400 determines that the sub-group of users is currently participating in a conversation related to another video but that the conversation is slowing (e.g., by determining that fewer comments are sent per hour, by determining that fewer than a threshold number of comments have been sent per user in the past hour, and/or any other suitable metric), process 400 can determine that the message is to be sent immediately. In some embodiments, in instances where the sub-group of users is currently participating in a conversation related to another video and the message is to be sent immediately, process 400 can cause the new video to be presented within the user interface in which the existing conversation is occurring.

As another example, in some embodiments, process 400 can determine the time based on how recently members of the sub-group have received other messages indicating the availability of new videos. As a more particular example, in some embodiments, process 400 can determine that at a least a predetermined amount of time (e.g., an hour, a day, and/or any other suitable time period) is to elapse between transmitted messages to the same sub-group of users.

As yet another example, in some embodiments, process 400 can determine the time based on previous times at which the sub-group of users have participated in conversations. As a more particular example, process 400 can determine particular times of day and/or days of the week when the sub-group of users have engaged in a conversation, and can determine that the message is to be sent at a similar time. As a specific example, if process 400 determines that the sub-group of users is more likely to engage in a conversation on weekends, process 400 can determine that the message is to be sent on the next weekend day.

Note that, in some embodiments, process 400 can determine that the message is to not be created and/or sent. For example, if process 400 determines that the sub-group of users is more likely to engage in a conversation on weekends, but the next weekend is a holiday weekend, process 400 can determine that the message is not to be sent, for example, in response to determining that the video will no longer be relevant to the sub-group of users by the following weekend. In instances where process 400 determines that the message is not to be sent, process 400 can end at block 418.

Process 400 can determine a conversation identifier to be associated with the message to be sent to the sub-group of users at 412. In some embodiments, the conversation identifier can be in any suitable format and can include any suitable characters (e.g., letters, numbers, non-alphanumeric characters, and/or any other suitable characters). In some embodiments, the conversation identifier can be randomly generated or can be a number incremented based on a previous conversation identifier. Additionally or alternatively, in some embodiments, the conversation identifier can indicate any suitable information. For example, in some embodiments, the conversation identifier can indicate a name and/or a title of the new video, an identifier of the content creator of the new video, a timestamp indicating a time at which the message is to be sent (as described above in connection with block 410), and/or any other suitable information. In some embodiments, the conversation identifier can be stored in association with identifiers of each user in the sub-group of users to indicate how recently the user participated in a conversation, how recently the user received a message indicating availability of a new video, and/or any other suitable information. The information can then be used to remove users from the sub-group of users, as described above in connection with block 408.

Process 400 can send the message at the determined time to user devices associated with users in the sub-group of users at 414 using any suitable technique or combination of techniques. For example, in some embodiments, process 400 can transmit the message using information associated with a user account (e.g., a username, and/or any other suitable information) authenticated on a particular device. An example of a user interface for presenting the received message on a user device is shown in and described above in connection with FIG. 1A. Note that the message can be any suitable type of message, such as a push notification, a text message, an email, and/or any other suitable type of message. In some embodiments, the transmitted message can be associated with the conversation identifier described above in connection with block 412. For example, in some embodiments, an indication that a message was transmitted can be stored in association with user account information for each user in the sub-group and the conversation identifier. Note that, in some embodiments, the conversation identifier can be used to prevent user devices that have already received a message within a particular time period from receiving a second message within the time period.

Note that, in some embodiments, rather than sending the message to the entire sub-group of users, process 400 can alternatively determine a primary user in the sub-group, and can first send the message to a user device associated with the primary user. In some embodiments, process 400 can then send the message to the remaining members of the sub-group of users after determining that the message has been selected and/or interacted with on the user device associated with the primary user. For example, in some embodiments, process 400 can send the message to the remaining members of the sub-group of users after determining that the primary user has entered text in the communication interface associated with the group conversation. In some embodiments, process 400 can determine that a message is not to be sent to a user in the sub-group of users who is already participating in a different group conversation after the message has been selected and/or interacted with by the primary user.

In some embodiments, process 400 can identify the primary user using any suitable information. For example, in some embodiments, the primary user can be the user in the sub-group of users who has participated in the largest number of conversations. As another example, in some embodiments, the primary user can be the user in the sub-group of users who has viewed the most videos created by the content creator of the video. As yet another example, in some embodiments, the primary user can be the user in the sub-group of users who has previously sent the most comments in conversations with the sub-group of users. As still another example, in some embodiments, the primary user can be the user in the sub-group of users with the most direct connections (e.g., first-degree connections) to the other users in the sub-group of users. In some embodiments, the primary user can be identified based on the likelihood that the primary user will enjoy and/or interact with the video if sent a message about the video, as calculated and described above in connection with block 404. In a more particular example, in some embodiments, process 400 can identify the primary user as the user in the sub-group of users with the highest likelihood of interacting with the video.

Process 400 can determine whether the message was selected on a user device associated with a user in the sub-group of users at 416 using any suitable technique(s). For example, in some embodiments, process 400 can determine whether the message was clicked and/or tapped on the user device. As a more particular example, in some embodiments, process 400 can determine whether the message was selected within a particular time period (e.g., within five minutes, within an hour, within five hours, and/or any other suitable time period) of when the message was sent. In some embodiments, if process 400 determines that the message was not selected within the particular time period, process 400 can determine that the message was not selected.

In some embodiments, if process 400 determines that the message was selected, process 400 can store an indication that the message was selected in association with an identifier of the user device and/or user account from which the message was selected as well as the conversation identifier. In such embodiments, the stored indication can indicate that the user is currently participating in a conversation about the new video, and, for example, can be used in the future to remove the user from other sub-groups, as described above in connection with block 408.

If, at block 416, process 400 determines that the message was not selected ("NO" at 416), process 400 can end at 418.

If, at block 416, process 400 determines that the message was selected on the user device ("YES" at 416), process 400 can cause the new video to be presented in a user interface that includes a conversation with other members of the sub-group of users at 420. For example, in some embodiments, the user interface can include a video player for presenting the new video and a communication interface for presenting comments received in the conversation, as shown in and described above in connection with FIG. 1B. Additionally, in some embodiments, the user interface can show a list of chat participants, as shown in and described above in connection with FIG. 1B. In some embodiments, the list of chat participants can include information indicating users who have already viewed the new video, users who are currently active in the conversation (e.g., based on how recently the user has entered a comment, and/or any other suitable information), users who are currently active on a user device on which the user interface including the group conversation is being presented, and/or any other suitable information.

Note that, in some embodiments, the presented user interface can include controls that allow a user to add a user not in the sub-group of users to the conversation. For example, in some embodiments, the user interface can include a user interface control that, when selected, allows a user to search for a particular username and/or e-mail address associated with an account on the video sharing service. Process 400 can then cause a message inviting a user associated with a selected username and/or e-mail address to join the conversation. Additionally or alternatively, in some embodiments, the presented user interface can include controls that allow a user to remove themselves from the conversation. For example, in some embodiments, the user interface can include a user interface control that, when selected, notifies other participants in the group conversation that the user has left the group conversation (e.g., by removing the user from indicator of chat participants 156, by inserting a comment in group conversation 158 indicating that the user has left the group conversation, and/or in any other suitable manner).

In some embodiments, at least some of the above described blocks of the process of FIG. 4 can be executed or performed in any order or sequence not limited to the order and sequence shown in and described in connection with the figures. Also, some of the above blocks of FIG. 4 can be executed or performed substantially simultaneously where appropriate or in parallel to reduce latency and processing times. Additionally or alternatively, some of the above described blocks of the process of FIG. 4 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for sending a message about a new video to a group of related users are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for sending messages about new media content to groups of users, the method comprising:
   determining that a media content item associated with a content creator has been uploaded to a media sharing service;
   identifying a group of users to receive a message indicating that the media content item is available by determining each user that has subscribed to a content source associated with the content creator;
   identifying a sub-group of users within the group of users by determining a likelihood of whether each user will engage with the media content item; and
   transmitting the message to the sub-group of users.

2. The method of claim 1, wherein the sub-group of users within the group of candidate users is identified based on relationship information associated with the users within the group to each other and based on the determined likelihood of each user engaging with the media content item.

3. The method of claim 1, further comprising:
   determining a time to send the message to the sub-group of users; and
   transmitting the message to the sub-group of users at the determined time.

4. The method of claim 3, wherein transmitting the message to the sub-group of users at the determined time further comprises:
   transmitting the message to a second user device associated with a second user of the sub-group of users;
   determining that the message has been selected on the second user device; and
   transmitting the message to the remaining sub-group of users in response to determining that the message has been selected on the second user device.

5. The method of claim 4, wherein the second user of the sub-group of users is identified based on a likelihood that the second user will engage with the media content item.

6. The method of claim 1, further comprising:
   determining that the message has been selected by a user device associated with a user of the sub-group of users; and
   causing the media content item to be presented in a user interface including a communication interface associated with the sub-group of users on the user device, wherein the user interface is associated with a conversation identifier.

7. The method of claim 1, further comprising:
   identifying one or more users within the sub-group of users who are unlikely to participate in a conversation about the media content item; and
   removing the identified one or more users from the sub-group of users.

8. A system for sending messages about new media content to groups of users, the system comprising:
   a memory;
   a hardware processor that, when executing computer-executable instructions stored in the memory, is programmed to:
      determine that a media content item associated with a content creator has been uploaded to a media sharing service;
      identify a group of users to receive a message indicating that the media content item is available by determining each user that has subscribed to a content source associated with the content creator;
      identify a sub-group of users within the group of users by determining a likelihood of whether each user will engage with the media content item; and
      transmit the message to the sub-group of users.

9. The system of claim 8, wherein the sub-group of users within the group of candidate users is identified based on relationship information associated with the users within the group to each other and based on the determined likelihood of each user engaging with the media content item.

10. The system of claim 8, wherein the hardware processor is further programmed to:
    determine a time to send the message to the sub-group of users; and
    transmit the message to the sub-group of users at the determined time.

11. The system of claim 10, wherein transmitting the message to the sub-group of users at the determined time further comprises:
    transmitting the message to a second user device associated with a second user of the sub-group of users;
    determining that the message has been selected on the second user device; and
    transmitting the message to the remaining sub-group of users in response to determining that the message has been selected on the second user device.

12. The system of claim 11, wherein the second user of the sub-group of users is identified based on a likelihood that the second user will engage with the media content item.

13. The system of claim 8, wherein the hardware processor is further programmed to:
    determine that the message has been selected by a user device associated with a user of the sub-group of users; and
    cause the media content item to be presented in a user interface including a communication interface associated with the sub-group of users on the user device, wherein the user interface is associated with a conversation identifier.

14. The system of claim 8, wherein the hardware processor is further programmed to:
    identify one or more users within the sub-group of users who are unlikely to participate in a conversation about the media content item; and
    remove the identified one or more users from the sub-group of users.

15. A non-transitory computer-readable medium containing computer executable instructions that, when executed by a processor, cause the processor to perform a method for sending messages about new media content to groups of users, the method comprising:

determining that a media content item associated with a content creator has been uploaded to a media sharing service;

identifying a group of users to receive a message indicating that the media content item is available by determining each user that has subscribed to a content source associated with the content creator;

identifying a sub-group of users within the group of users by determining a likelihood of whether each user will engage with the media content item; and transmitting the message to the sub-group of users.

16. The non-transitory computer-readable medium of claim 15, wherein the method further comprises wherein the sub-group of users within the group of candidate users is identified based on relationship information associated with the users within the group to each other and based on the determined likelihood of each user engaging with the media content item.

17. The non-transitory computer-readable medium of claim 15, wherein the method further comprises:

determining a time to send the message to the sub-group of users; and transmitting the message to the sub-group of users at the determined time.

18. The non-transitory computer-readable medium of claim 17, wherein transmitting the message to the sub-group of users at the determined time further comprises:

transmitting the message to a second user device associated with a second user of the sub-group of users;

determining that the message has been selected on the second user device; and transmitting the message to the remaining sub-group of users in response to determining that the message has been selected on the second user device.

19. The non-transitory computer-readable medium of claim 18, wherein the second user of the sub-group of users is identified based on a likelihood that the second user will engage with the media content item.

20. The non-transitory computer-readable medium of claim 15, wherein the method further comprises:

determining that the message has been selected by a user device associated with a user of the sub-group of users; and causing the media content item to be presented in a user interface including a communication interface associated with the sub-group of users on the user device, wherein the user interface is associated with a conversation identifier.

21. The non-transitory computer-readable medium of claim 15, wherein the method further comprises:

identifying one or more users within the sub-group of users who are unlikely to participate in a conversation about the media content item; and removing the identified one or more users from the sub-group of users.

* * * * *